June 14, 1938.   E. DÄSTNER   2,120,394
TREE FELLING DEVICE
Filed Nov. 21, 1936   2 Sheets-Sheet 1

Inventor:
Erich Dästner

June 14, 1938.  E. DÄSTNER  2,120,394
TREE FELLING DEVICE
Filed Nov. 21, 1936   2 Sheets-Sheet 2

Inventor:
Erich Dästner
By Chatwin Company
Attys

Patented June 14, 1938

2,120,394

UNITED STATES PATENT OFFICE 2,120,394

TREE FELLING DEVICE

Erich Dästner, Berlin, Germany

Application November 21, 1936, Serial No. 112,027
In Germany December 17, 1935

4 Claims. (Cl. 143—63)

For felling trees, hand saws or power-driven sawing devices have been so far used which were driven by an electric motor or by an internal combustion engine. If a hand saw is used which is usually operated by two men, the cut has to be made at least at breast-height so that the remaining stump of the tree is rather high or long. The use of power-driven sawing devices, on the other hand, is very troublesome and expensive; moreover, if an electric motor is used, it is difficult to provide the electric power for the same at the remote working places in the woods.

My invention relates to a tree felling device having as an essential characteristic feature a sawing device cutting in a horizontal direction or plane, as known per se, this device, however, being provided with a foot or pedal drive which, at the same time, effects the required feed-action, when operating the saw. Foot-driven sawing devices for trees are already known, these known devices, however, were not adapted for felling trees, but were merely used for cutting trunks to pieces which are already in a horizontal position.

Compared to the hand saw my invention offers the additional advantage that the saw can be applied in a much lower position at the trunk so that more wood is gained. Moreover it is much easier to actuate the saw by pedals than to drive it by hand.

Two different constructional forms of my invention are shown in the drawings, in which Fig. 1 is an elevation of the sawing device having a saw blade which moves to and fro in a straight direction;

Figure 1:
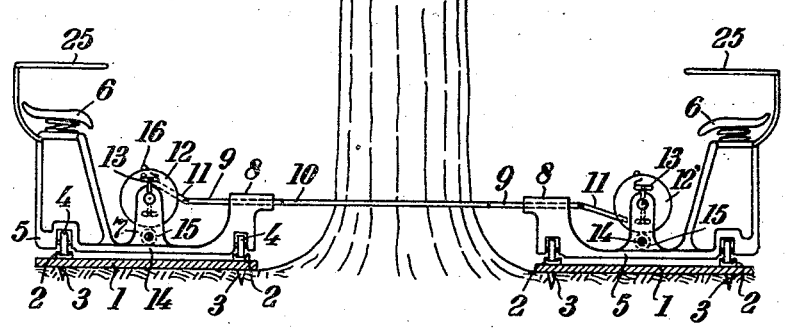
Figure 2:
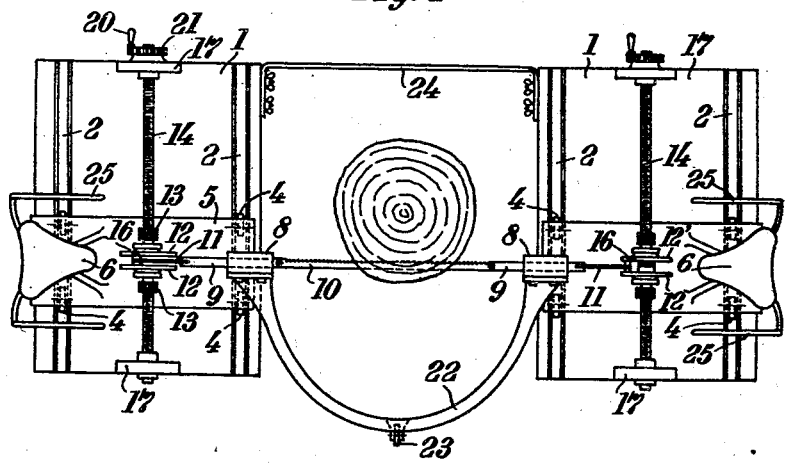
Fig. 2 is a plan view thereof.
Figure 3:
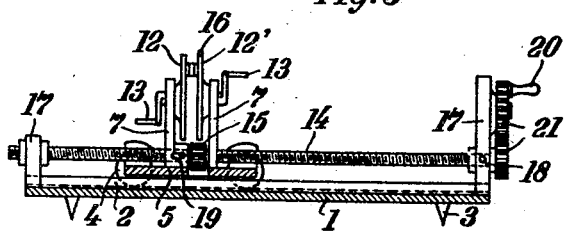
Fig. 3 is a fragmentary side elevation thereof, partly in section.

The device shown in Fig. 1 is adapted for being operated by two persons. To this end, a base plate 1 is placed on the ground on either side of the tree, which plates are provided with rails 2. The lower faces of the base plates 1 are provided with teeth or pointed projections 3, for engagement with the soil. On the rails 2 rest the carriages 5, by means of the rollers 4. The carriages 5 are equipped with seats 6, pedal crank bearings 7 and guiding members 8 for the saw-rods 9. The two ends of the saw blade 10 are held under tension by the rods 9. The two rods 9 are connected with the disks or wheels 12, 12' which bear the crank pins, by means of the connecting rods 11. The disks 12, 12' are rotated by means of the pedals 13, thus causing the saw blade 10 to move to and fro. In order to effect a uniform feeding movement of the saw blade on both ends thereof, in an automatic manner, a threaded spindle or rod 14 is arranged on the base plates or frames 1, this spindle carrying a toothed wheel 15 which has a threaded central bore engaging with the threaded spindle. Now, when actuating the pedal crank, the toothed wheel 15 is rotated by steps with every revolution of the discs 12, 12' by the intermediary of a cam 16 which is mounted on the discs 12 and 12' and engages the wheel 15. The spindle 14 is free to move through the carriage 5, while the toothed wheel 15 rests against the vertical faces of the crank shaft bearings 7. Therefore, if the wheel 15 is moved by the cam 16 of the disc 12', it moves forward on the threaded spindle 14 and causes the carriage 5 to partake in its movement. Of course, the pitch of the thread should be so chosen that the carriage is very slowly moved or fed forward only, in accordance with the cutting action of the saw blade. In order to prevent the spindle 14 from rotating in its bearings 17, it can be locked therein, for instance by means of a bolt 18. If it is intended, after the trunk has been cut through, to move the carriage back into its original position, the locking bolt 18 is withdrawn and a locking member 19 which is mounted at the carriage 5, preferably in a swingable and resilient manner, is caused to engage into the toothed wheel 15 so as to prevent its rotation. Now, the spindle 14 is rotated by means of the crank 20 and the gear 21; as the toothed wheel 15 is locked by the member 19 and consequently cannot rotate, it is moved rearwards by the spindle 14 and causes the carriage 5 to partake in this movement. According to the rotational direction of the crank 20 a forward or rearward movement of the carriage is effected.

In order to ensure the correct relative position of the base plates 1 and carriages 5 on either side of the tree, the guiding supports 8 are provided with a member 22 which can be screwed on and is preferably provided with a roller support 23. The two base plates or frames 1 are connected by a member 24 which can be screwed on. The seats 6 are preferably provided with handles 25.

The afore-described device is adapted for operation by two workmen but alternatively it is also possible to arrange the same in a suitable manner for operation by one workman. In this case only one base plate and one carriage are necessary and a suitable stronger saw blade has to be used which, moreover, has to provided with a guiding member extending towards the tree, as known per se.

Figure 4:
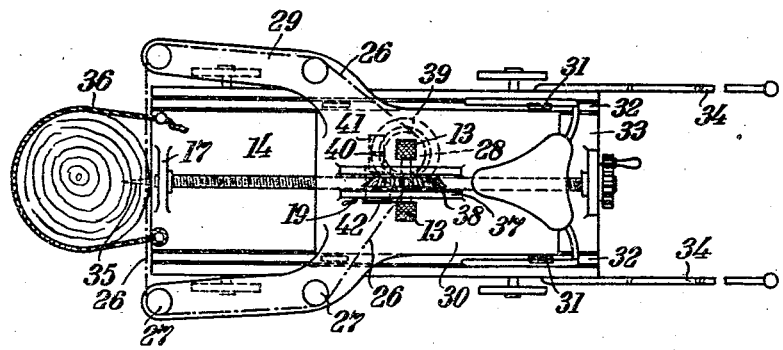
Fig. 4 is a plan view of a chain- or belt-saw.
Figure 5:
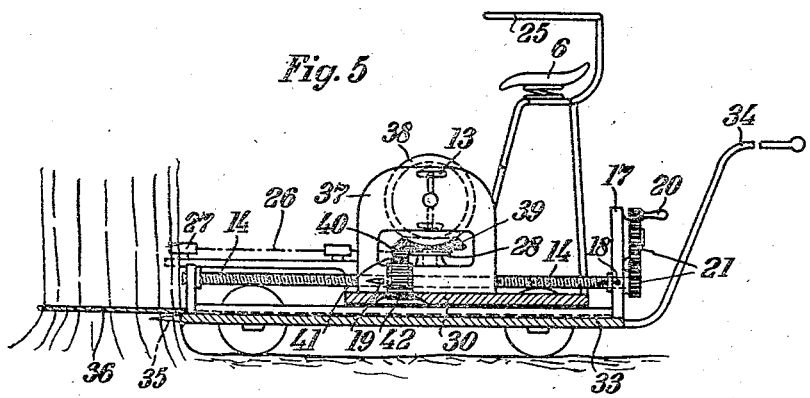
Fig. 5 is a side elevation thereof, partly in section.
Figure 6:
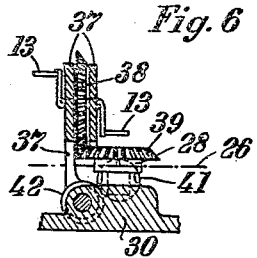
Fig. 6 is a fragmentary view thereof, partly in section.

The device according to Figs. 4 to 6 shows the drive of a chain- or belt-saw. In these drawings the chain-saw itself is represented by dotted lines (.—.—.—) and marked 26. It runs over rollers 27 and 28. The rollers 27 are mounted on the limbs or arms 29 of the carriage 30. This carriage 30 is movable on the rails 32 of the wheeled frame 33, by means of its rollers 31. This wheeled frame 33 is provided with handles 34 so that the sawing device can be transported to and from the working place, without any mounting or dismounting. In order to fell the tree, the wheeled frame 33 is forced towards the trunk so that its pointed projection enters into the same. The wheeled frame is then fixedly held to the tree by means of a wire rope 35 which is laid around the same. Mounted on the carriage 30 is a seat 6 having handles 25. The pedals 13 which are rotatably mounted on cranks in the bearings 37, serve for driving a bevel-wheel 38 which in turn drives another bevel-wheel 39 which is rigidly connected with the roller 28 by which the chain-saw is driven. Accordingly the chain-saw 26 is moved by actuating the pedals 13. Below the toothed wheel or bevel-wheel 39 is a cam 40 which engages at each revolution the toothed wheel 41 and imparts a movement to the same which is simultaneously transmitted to a toothed wheel 42. The toothed wheel 42 has a threaded bore which engages a threaded spindle which corresponds to the threaded spindle 14 of the first described constructional form and accordingly is also marked 14. Inasmuch as the toothed wheel 42 also in this case is embraced by the bearing supports 37 of the carriage 30, the same feeding action results with respect to the saw as in the first mentioned form of construction. In order to move the carriage by hand, a locking member 19 and a hand crank 20 with a suitable reduction gearing 21 are provided. The limbs or arms 29 are so spaced from each other that they will easily pass by the trunk on the feeding motion of the carriage, without touching the trunk. The chain-saw of this form of construction runs only in one direction, in a circular movement.

It will be understood that although certain specific kinds of saws have been described in detail in combination with the mechanism according to my invention, other types of saws, for instance circular saws or rotary cutters, segment saws and the like may also be used in combination with my novel pedal drive, without departing from the scope of my invention.

I claim:—

1. A tree felling device comprising in combination, a frame, a movable carriage thereon, a substantially horizontally-cutting saw on said carriage, a crank mechanism including pedals and cams, bearings supporting said pedal drive, a toothed wheel laterally guided by said bearings, a screw threaded central bore in said toothed wheel, and a screw threaded rod supported and secured against rotation in said frame and engaging with the screw threaded bore of said toothed wheel, said cams of the crank mechanism engaging with the teeth of said toothed wheel for automatically displacing the carriage on the frame when actuating the crank mechanism.

2. A tree felling device comprising in combination, a frame, a movable carriage on said frame, a substantially horizontally-cutting saw on said carriage, a crank mechanism including pedals and cams, bearings supporting said pedal drive, a toothed wheel laterally guided by said bearings, removable means on said carriage for securing said wheel against rotation, a screw threaded rod rotatably mounted in said frame, detachable means for securing said screw threaded rod against rotation in the frame, and a hand crank for rotating said rod, said wheels having a screw threaded bore for engagement with said screw threaded rod so that the wheel is capable of being screwed to and fro on said screw threaded rod in locked position, by rotation of said rod.

3. A tree felling device, comprising in combination, a bipartite frame, two movable carriages on said frame, a straight horizontally-cutting saw, means for movably guiding and holding said saw under tension between said carriages, a pedal drive and means for reciprocating the saw, cams included in said pedal drive, bearings supporting said pedal drive, a toothed wheel laterally guided by said bearings, a screw threaded central bore in said toothed wheel, and a screw threaded rod supported and secured against rotation in said frame and engaging in the screw threaded bore of said toothed wheel, said cams engaging with the teeth of said toothed wheel for imparting a forward movement to said carriages in a substantially perpendicular direction with respect to said saw movement.

4. A tree felling device comprising in combination a bipartite frame, two movable carriages on said frame, a straight horizontally-cutting saw, means for movably guiding and holding said saw under tension between said carriages, a pedal drive and means for reciprocating the saw, cams included in said pedal drive, bearings supporting said pedal drive, a toothed wheel laterally guided by said bearings, removable means on said carriage for securing said wheel against rotation, a screw threaded rod rotatably mounted in said frame, detachable means for securing said screw threaded rod against rotation in the frame and a hand crank for rotating said rod, said wheel having a screw threaded bore for engagement with said screw threaded rod so that the wheel is capable of being screwed to and fro on said screw threaded rod in locked position by rotation of said rod.

ERICH DÄSTNER.